United States Patent

Fiddler

[11] 3,737,270
[45] June 5, 1973

[54] CLUSTERED MOLDS FOR INJECTION MOLDING TWO OR MORE PARTS IN PIVOTAL ASSEMBLED CONDITION IN A FRAME

[76] Inventor: Theodore E. Fiddler, 1268 Suffield Drive, Birmingham, Mich. 48009

[22] Filed: Sept. 27, 1971

[21] Appl. No.: 183,757

[52] U.S. Cl. .................425/242, 249/142, 249/151
[51] Int. Cl. ...............................................B29f 1/00
[58] Field of Search.....................249/161, 151, 142, 249/144; 425/242, 130, 117, 120, 121, 123, 125, 129, 437

[56] References Cited

UNITED STATES PATENTS

| | | | |
|---|---|---|---|
| 3,456,913 | 7/1969 | Lutz | 425/437 X |
| 2,495,539 | 1/1950 | Natzler et al. | 249/142 X |
| 2,559,360 | 7/1951 | Fay | 425/125 |
| 2,559,361 | 7/1951 | Fay | 425/125 |
| 3,259,680 | 7/1966 | Schelke | 425/129 X |

Primary Examiner—J. Spencer Overholser
Assistant Examiner—Michael O. Sutton
Attorney—William T. Sevald

[57] ABSTRACT

A mold having compound clustered cavities within and outside one another for injection molding a plurality of parts at the same time in assembled rotational relationship wherein an outer cavity forms a first part and an inner cavity forms a second part. Channels lead between the cavities. Retractable plugs lie in the channels and across the outer cavity so that the first part is molded around the plugs which form bearing apertures. Each plug has an internal bore communicating with the inner cavity. When the second part is molded, the bore in the plug molds shafts on the second part with the shafts lying in the apertures of the first part as each plug molds both the shaft and the bearing aperture. This directly rotationally mounts the first and second parts in assembled condition due to the clustered cavities.

7 Claims, 21 Drawing Figures

INVENTOR:
Theodore E. Fiddler

BY: *Willis P. Sewald*

ATTORNEY

INVENTOR:
Theodore E. Fiddler

BY: *signature*

ATTORNEY

INVENTOR:
Theodore E. Fiddler

BY: *Willi T. Swald*

ATTORNEY

3,737,270

CLUSTERED MOLDS FOR INJECTION MOLDING TWO OR MORE PARTS IN PIVOTAL ASSEMBLED CONDITION IN A FRAME

BACKGROUND OF THE INVENTION

In the prior art where an article has a supporting frame member and a plurality of like or similar parts mounted in the frame in pivotal relationship, it has been the practice to mold a plurality of like parts individually and repeatedly to acquire the desired number and to make the frame separately in desired quantity and then to mount each like part individually in each frame. This required inventories of the like parts and the frames, movement from the molding machines to an assembly location, workmen to mount the like parts in the frames, and tools and equipment for the purpose. In many instances, third parts such as axles, pivot pins, and attachments and auxiliary operations are required. This all takes considerable plant space, many man hours, and high inherent expense. Thus the assemblies are much more expensive than if the assemblies were made in one operation.

SUMMARY OF THE INVENTION

The invention relates to compound or clustered molds having cavities within cavities for injection molding a plurality of parts with one or more shafts on one part or set of parts in the bearing apertures of one or more other parts in assembled rotational condition.

An object of the invention is to provide a compound mold for molding a plurality of parts having at least one outside or surrounding cavity for forming one part or set of parts and at least one inside or surrounded cavity for forming another part or set of parts with the parts in assembled relationship to each other.

A further object of the invention is to provide a mold for directly molding a shaft on one part in a bearing aperture of the other part in desired plurality of parts, shafts, and bearing apertures.

A further object of the invention is to provide one or more communicating channels between cavities for different parts.

A further object of the invention is to provide a plug in each communicating channel having an end lying in one cavity to form a bearing aperture in one part.

A further object of the invention is to provide an internal bore in the end of each plug in communication with the other cavity forming the other part to form a shaft on the other part within the area of the bearing aperture formed in the one part.

A further object of the invention is to provide various shapes for the end of the plug in conjunction with various shapes for the internal bore of the plug to provide a closer rotational fit between the shaft and the bearing aperture, angular bias therebetween, and/or anti-rattle characteristics.

A further object of the invention is to provide spacing at the end of a plug between the cavity portions to form a thin frangible interconnecting web between the parts which is easily severed to free the shaft in the bearing aparture to provide a close fit when severed or to attach the parts until time of use.

A further object of the invention is to provide a slide sleeve in the plug which is advanceable to sever a web connecting the parts by compressing the material of one part so that it flows back in close fit on the shaft.

These and other objects of the invention will become apparent by reference to the following descripton of a mold having multiple clustered cavities which is exemplary of the invention taken in connection with the accompanying drawings in which:

DESCRIPTION OF THE ILLUSTRATED EMBODIMENT

Figure 1:
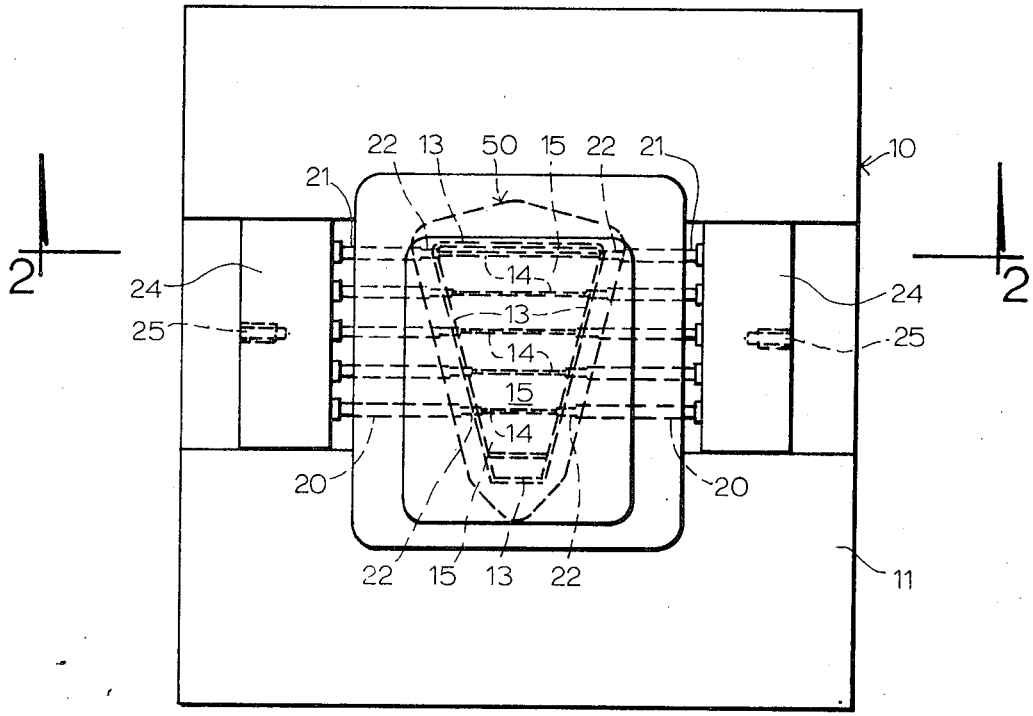
FIG. 1 is a cross-sectional view of the mold seen in FIG. 2 taken on line 1—1 of FIG. 2.
Figure 2:
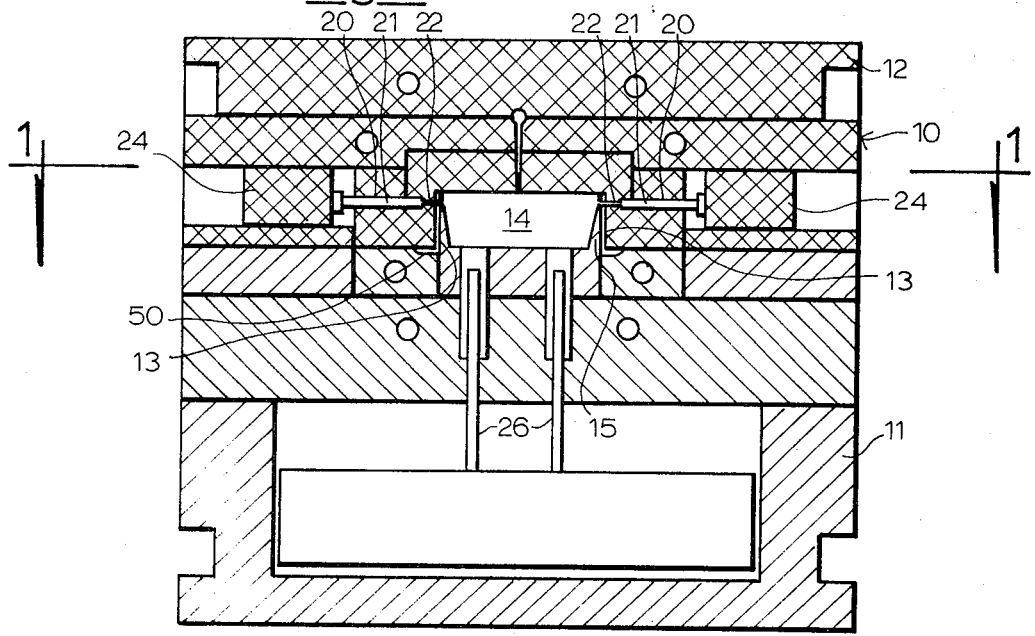
FIG. 2 is a cross-sectional view of the mold of FIG. 1 as indicated by the line 2—2 of FIG. 1, showing the base portion in cross-section lines and the top portion in cross-hatch lines.
Figure 3:
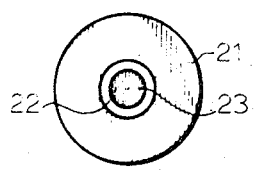
FIG. 3 is an end view of the plug seen in FIG. 4 showing an annular end and bore; enlarged relative to FIGS. 1 and 2.
Figure 4:
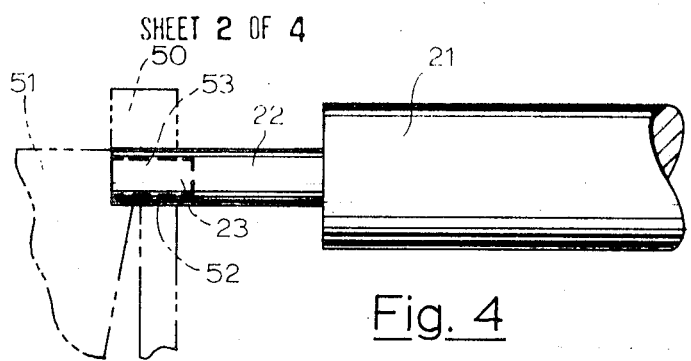
FIG. 4 is a side view of the plug seen in FIG. 3 showing mold and part relationships in dotted lines.
Figure 5:
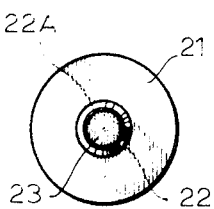
FIG. 5 is an end view of the plug seen in FIG. 6 showing a tapered end; enlarged relative to FIGS. 1 and 2.
Figure 6:
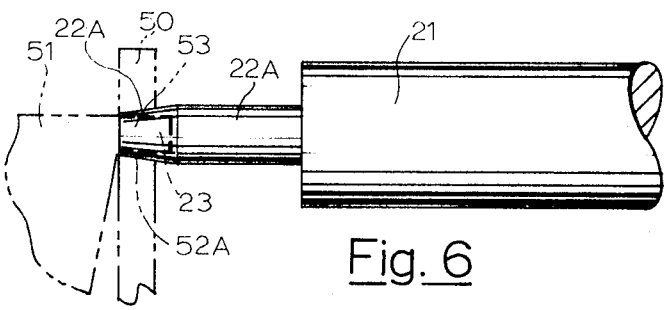
FIG. 6 is a side view of the plug seen in FIG. 5 showing mold and part relationships in dotted lines.
Figure 13:
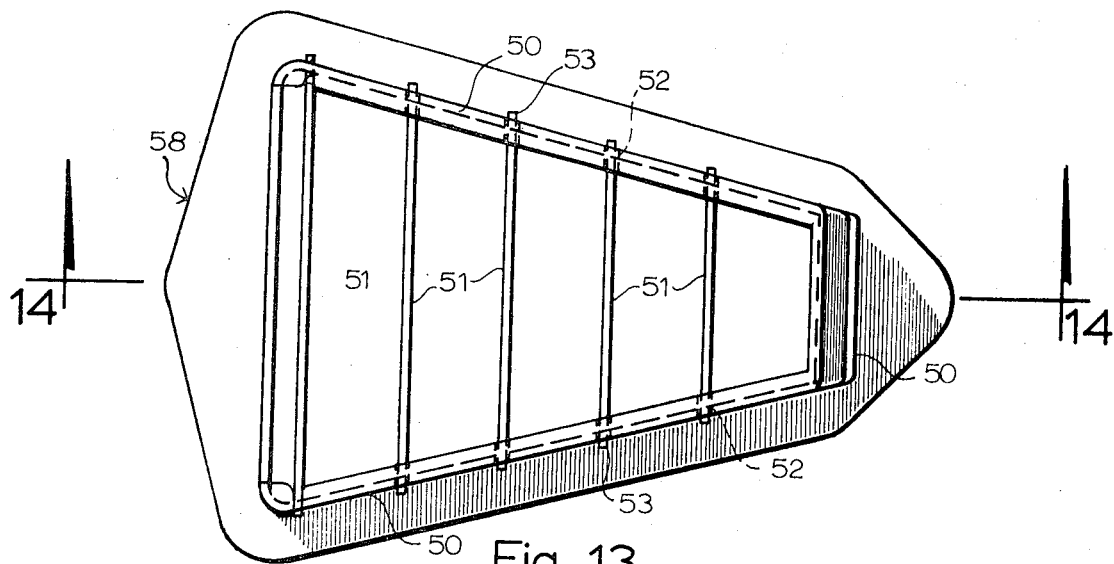
FIG. 13 is an enlarged face elevational view of a louvered ventilator assembly made in the mold seen in FIGS. 1 and 2 with the louvers in the molded or open position.
Figure 14:
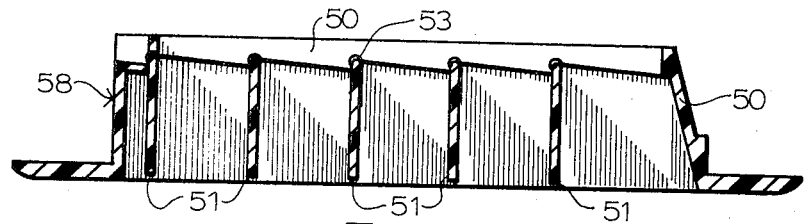
FIG. 14 is a cross-sectional view of FIG. 13 taken on the line 14—14 thereof.
Figure 15:
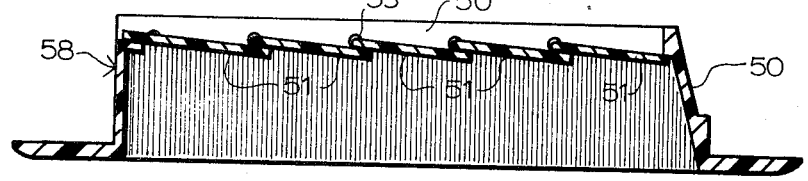
FIG. 15 is a view similar to FIG. 14, showing the louvers rotated to the closed position substantially normal to the molded or open position.

Referring now to the drawings wherein like numerals refer to like and corresponding parts throughout the several views, the compound clustered mold 10 disclosed to illustrate the invention, together with various products disclosed to illustrate the use of the inventive molds, comprises a base 11 seen in plan in FIG. 1 and in cross-section in FIG. 2. A top 12 shown cross-hatched in FIG. 2 interfits with the base 11 to form cavities to mold the products. The louvered ventilator 58 seen in FIGS. 13–15 is made in the mold 10 and includes a frame 50 and louvers 51. The frame 50 is molded in the surrounding or outside cavity 13 of the base 11 and top 12. The louvers 51 are formed in surrounded or inside cavities 14 in the male portion 15 of the base 11. The inside cavities 14 are separated from the outside cavity 13 by the male portion 15. Thus the frame 50 and louvers 51 are individually molded at the same time in one operation in assembled relationship.

A channel 20 in the top 12 leads through the outside cavity 13 to each inside cavity 14 on both ends of each inside cavity 14. A plug 21 lies in each channel 20 and has an end 22 extending through the outside cavity 13 and male portion 15 to the inside cavity 14. When the frame 50 is molded, the end 22 of each plug 21 lying across the outside cavity 13 thus forms a bearing aperture 52 in the frame 50, FIG. 13.

The end 22 of the plug 21 has an internal bore 23, FIGS. 3–9, 11, 20, and 21. The bore 23 communicates with its associated inside cavity 14. When the inside cavity 14 is injected, the material forms the louver 51 and flows into the bore 23 and forms a shaft 53 on the louver 51, FIGS. 1–15, 20, and 21.

The shaft 53 is thus molded in the bearing aperture 52 as the end 22 and the bore 23 of the plug 21 lie in the same area of the frame 50.

A cross-slide 24 in the mold top 12, as shown, or in the mold base as will be understood, is attached to one or more plugs 21. An arm, not shown, is attached to the slide 24 in the threaded hole 25 of the slide 24. The slide 24 is actuated via the arm by power cylinders, toggles, cams, etc., to advance the cross-slide 24 to the molding position shown in FIGS. 1 and 2 and to retract the cross-slide 24 to withdraw the ends 22 of the plugs 21 away from the inside cavities 14 and out of the outside cavity 13.

Upon each plug 21 being retracted after the injection molding, the end 22 of each plug 21 is moved out of the outside cavity 13 and thus is moved out of the frame 50 leaving the bearing aperture 52 formed therein and the plug end bore 23 is moved away from the inside cavity 14 and the louver 51 formed therein leaving the shaft 53 on the louver 51 in the bearing aperture 52 of the frame 50. Thus the louvers 51 and the frame 50 are molded in fully assembled rotational relationship.

After the plugs are withdrawn by the slide 24, the mold top 12 is moved off the base 11 and ejection means, such as the pins 26, FIG. 2, lift the louvers 51 and the frame 50 out of the mold base 11 and male portion 15 in fully assembled and operably interconnected direct rotational relationship.

The ventilator frame 50 and louvers 51 are examples of rotational parts for explaining the mold and are not intended as a limitation on the invention.

Figure 16:
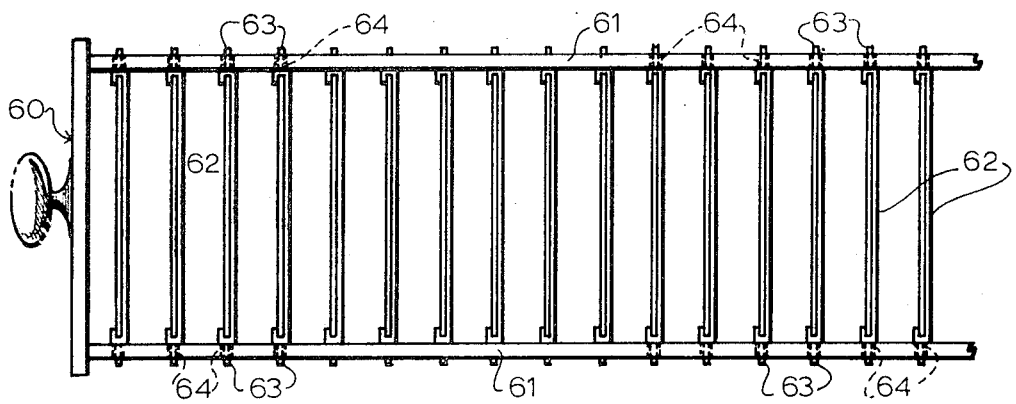
FIG. 16 is a top plan view of a file tray seen in FIG. 17 showing some of the leaves rotationally mounted in the frame as made in a mold similar to that seen in FIGS. 1 and 2 and showing a pull knob in dotted lines.
Figure 17:
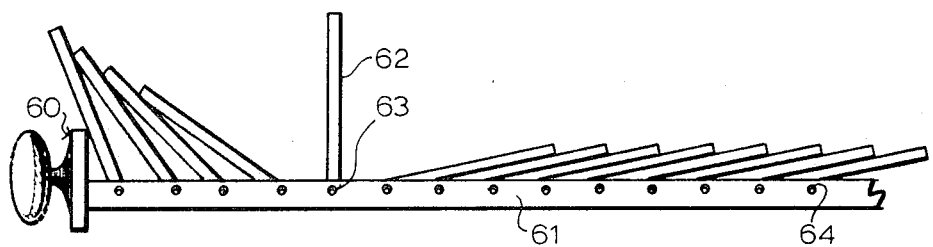
FIG. 17 is a side elevational view of a file tray, such as seen in FIG. 16, showing the leaves rotationally mounted on the frame at various angles.

Products other than the louvered ventilator 58 may be made in the compound clustered molds of the invention such as the file card tray, 60, FIGS. 16 and 17, having a frame 61 and leaves 62 directly rotationally mounted on the frame 61 via shafts 63 on the leaves 62 lying in bearing apertures 64 of the frame 61 in fully assembled rotational relationship.

Figure 18:
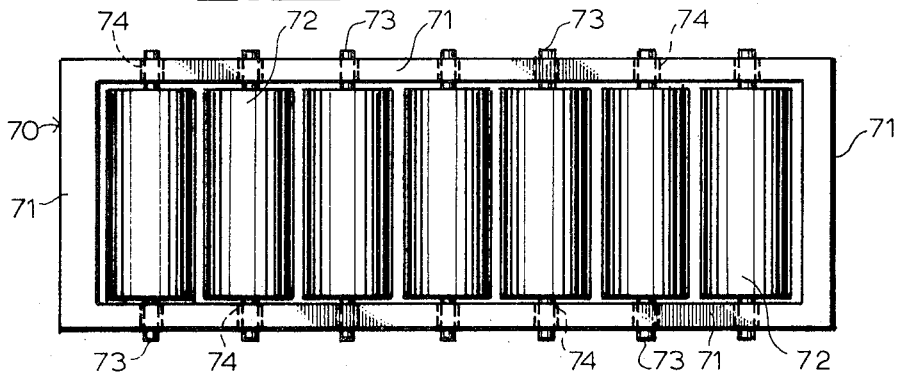
FIG. 18 is a top plan view of a conveyor assembly seen in FIG. 19 showing the rollers pivotally mounted in the frame in broken lines as made in a mold similar to that seen in FIGS. 1 and 2.
Figure 19:
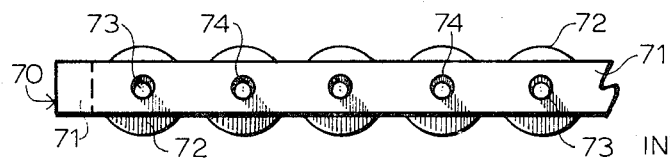
FIG. 19 is a side elevational view of the conveyor seen in FIG. 18, partly broken away.

A conveyor 70, FIGS. 18 and 19, may be made in the molds of the invention having a frame 71 and rollers 72 directly rotationally mounted on the frame 71 via shafts 73 on the rollers 72 lying in bearing apertures 74 of the frame 71 in fully assembled rotational relationship.

The plug end 22 and bore 23 may be cylindrical as shown in FIGS. 3, 4, 7, and 8 or shaped otherwise such as shown in FIGS. 5, 6, 9, 11, and 20. More particularly, in FIGS. 5 and 6, the end 22 of the plug 21 has a tapered nose 22A which forms a tapered bearing aperture 52A in the frame 50. The tapered aperture 52A thus has a minor diameter more closely fitting on the shaft 53 providing less play between the shaft 53 and the aperture 52A.

Figure 9:
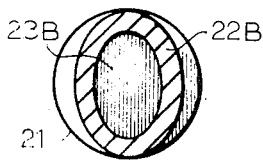
FIG. 9 is an end view of an oval end and bore in the plug; enlarged relative to FIGS. 1 and 2.
Figure 10:
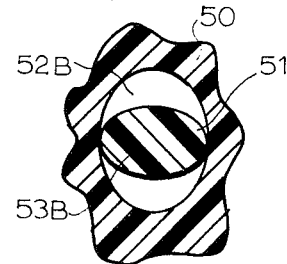
FIG. 10 is a cross-sectional view, broken away, of the bearing aperture and shaft formed on parts by the oval end of the plug of FIG. 9, with the shaft lying normal to the molded position.

The end 22B of the plug 21 may be oval and have an oval bore 23B, FIG. 9, which forms an oval bearing aperture 52B in the frame 50 and an oval shaft 53B on the louver 51, FIG. 10. The minor diameter of the aperture 52B may be equal to, less than, or more than the major diameter of the shaft 53B. This achieves close fitting, small clearance, or stoppage at a point, respectively, between the shaft 53B and the bearing aperture 52B. This is advantageous in various products such as when the use position is normal to the molding position, eccentric action is desirable, and/or anti-rattle characteristics are needed, etc., for example.

Figure 11:
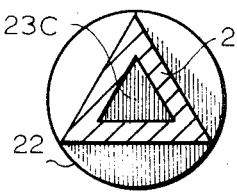
FIG. 11 is an end view of a triangular end and bore in the plug; enlarged relative to FIGS. 1 and 2.
Figure 12:
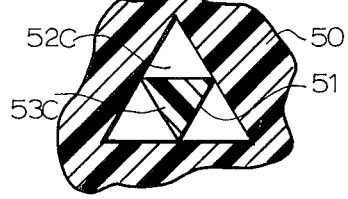
FIG. 12 is a cross-sectional view, broken away, of the bearing aperture and shaft formed on parts by the triangular end of the plug of FIG. 11 with the shaft rotated 120° from the molded position.

The end 22C of the plug 21 may be angular and have an angular bore 23C, FIG. 11, which may be triangular, as shown, or rectangular, etc., which forms an angular bearing aperture 52C in the frame 50 and an angular shaft 53C on the louver 51, FIG. 12, with the major diameter of the shaft 53C approximating the minor diameter of the bearing aperture 52C similarly as shown and described relative to the embodiment of FIGS. 9 and 10.

Figure 7:
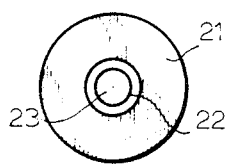
FIG. 7 is a view similar to FIG. 3.
Figure 8:
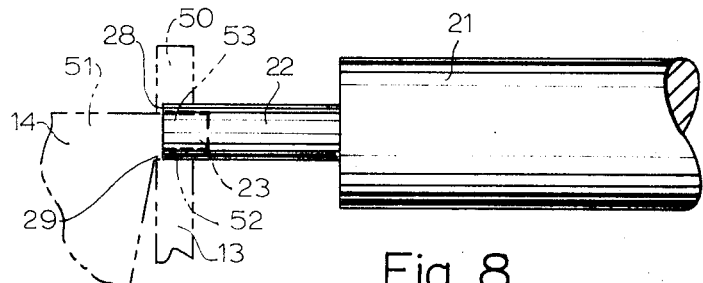
FIG. 8 is a side view of the plug seen in FIG. 7, similar to FIG. 4, but showing space at the tip of the plug allowing communication between the different cavities to form a thin frangible web between the different parts molded in the cavities.

Referring now to FIGS. 7 and 8, the tip 28 of the end 22 of the plug 21 lies spaced within the outside cavity 13 allowing molding material to flow between the inside cavity 14 and the outside cavity 13 so that when the frame 50, louver 51, and shaft 53 are molded, a thin frangible web of material lies in the space 29 at the tip 28. This web is easily severed when the shaft 53 is moved axially and/or angularly relative to the frame 50. The web provides the advantage of attached parts for handling, shipping, storage, processing, etc.; preventing loss and breakage; and also upon severance, provides a close fitting shaft and bearing with minimal frictional engagement.

Figures 20, 21:
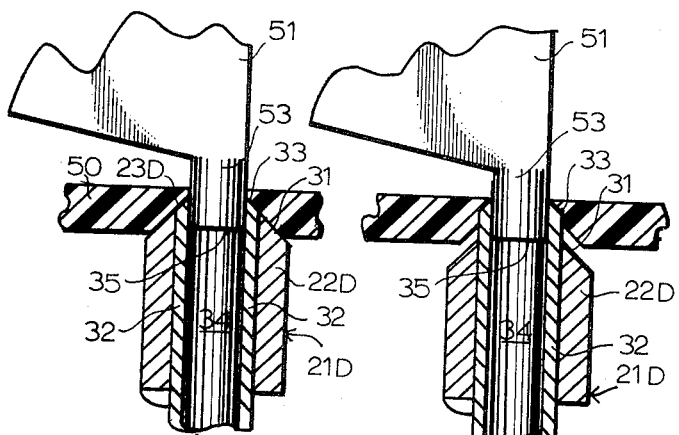
FIG. 20 is a view similar to FIGS. 5–8 showing a plug having a tapered nose and tapered co-axial slide sleeve in the molding position.
FIG. 21 is a view of the device seen in FIG. 20, showing the slide sleeve in the extended shearing and compressing position.

Referring now to the plug 21D of FIGS. 20 and 21, the end 22D has a tapered nose 31 and an internal coaxial slide-sleeve 32 with a tapered nose 33. The tapered noses 31 and 33 are in-line in the molding position seen in FIG. 20 to form a tapered bearing aperture in the frame 50. A core 34 is attached to the plug 21D and has an outer end 35 spaced within the slide-sleeve 32 to define the bottom of the bore 23D which is circumferentially defined by the exposed internal wall of the slide-sleeve 32 thereabove. The bore 23D forms the shaft 53 on the louver 51. The noses 31 and 33 are spaced within the outside cavity 13 forming the frame 50 to allow molded interconnection between the shaft 53 and the frame 50. After the molding operation, the slide-sleeve 32 is advanced from the position seen in FIG. 20 to that seen in FIG. 21, thereby severing the interconnection between the shaft 53 and the frame 50 and compressing the material of the frame 50 in its advancement. After the mold plug 21D is retracted from the outside cavity 13, the molded shaft 53 is left in a close fitting bearing aperture 52 as the compressed material of the frame 50 flows or springs back toward the shaft 53.

While a mold for a louvered ventilator having a plurality of parts has been shown and described as an example and while only a file tray and a conveyor have been shown and described as other suitable products, it will be understood that various other direct rotational products may be made in molds embodying the invention.

It is to be particularly noted that the parts of the products are directly rotationally molded and assembled and that brackets, arms, etc. are not employed and are unnecessary with the molds of the invention, that the molds are devoid of cavities for same, and that side-by-side cavities for different parts are incapable of producing the devices produced by the molds of the invention.

It is readily apparent that the compound or clustered molds of the invention facilitate the injection molding of relatively stationary members such as frames, bodies, etc. and multiple relatively rotational members such as louvers, leaves, rollers, wheels, shafts, etc. directly in one another in direct rotational relationship. The direct rotational relationship facilitates large pluralities of parts in close proximity which arms, brackets, etc. prohibit and which non-clustered molds cannot form in assembled rotational relationship.

The high utility of the compound or clustered molds of the invention is very obvious as the savings of multiple molds, multiple injections, separate parts, assembly of parts, etc. is completely obviated.

The scope of the invention is defined in the appended claims.

I claim:

1. A compound clustered mold for injection molding at least two internal parts in assembled rotational relationship with a frame part comprising,
    an outer female mold having cavity portions for molding the outside of a first outside frame part;
    said outer female cavity portions having opposite sides for forming the opposite outward sides on the first frame part;
    an inner male mold having cavity portions for molding the inside of the first outside frame part and at least two second parts within the first frame part;
    said second male cavity portions having opposite ends adjacent said opposite sides of said outer female cavity portions to locate the opposite ends of the second parts at the opposite sides of the first part;
    said female mold including at least two pairs of dual channels between each said opposite side of said outer female cavity portions at each said opposite end of said inner male cavity portions;
    said channels lying in axial alignment relative to each other;
    an advanceable-retractable dual plug lying in each said channel;
    said outer female mold having an opening on either side defining paired slide-ways at said plugs; and
    a cross-slide in each said slide-way connected to said plugs adjacent thereto;
    said cross-slides advancing said plugs to their advanced position and retracting said plugs to their retracted position;
    each said dual plug having an end in the area of one said side of said outer female cavity portions when advanced for forming paired aligned bearing apertures in the opposite sides of the first part;
    said end of each said dual plug having an internal bore communicating with one said opposite end of said second male cavity portions when advanced for forming shafts on the opposite ends of the second parts;
    said internal bore in said end of each said dual plug when advanced extending back into the area of said end of each said dual plug which lies in said opposite sides of said outer female cavity portions so that said bore molds the shafts on the opposite ends of the second parts in the area of the bearing apertures formed in the opposite sides of the first part;
    said dual plugs when retracted after a molding operation leaving the shafts on the opposite ends of the second parts in the bearing apertures in the opposite sides of the first part thereby directly rotationally interconnecting the parts in assembled relationship;
    said mold being openable after molding by first retracting said cross-slides and said plugs and then separating said male and female molds.

2. In a mold as set forth in claim 1, said end of said plug being oval shape in cross-section for forming an oval bearing aperture having a major and a minor diameter in the one part;
    said internal bore in said end of said plug being oval shape in cross-section for molding an oval shaft having a major and a minor diameter on the other part;
    said major diameter of said bore being about the same dimension as the minor diameter of said end of said plug;
    the parts after molding being rotatable to an angular position substantially normal to the molding position with the major diameter of the shaft lying substantially across the minor diameter of the aperture.

3. In a mold as set forth in claim 1, said end of said plug being angular shape in cross-section for forming an angular bearing aperture having a major and a minor diameter in the one part;
    said internal bore in said end of said plug being angular shape in cross-section for molding an angular shaft having a major and a minor diameter on the other part;
    said major diameter of said bore being about the same dimension as the minor diameter of said end of said plug;
    the parts after molding being rotatable to an angular position normal to the molding position with the major diameter of the shaft lying substantially across the minor diameter of the aperture producing a close fit therebetween.

4. In a mold as set forth in claim 1, said end of said plug having a tapered portion gradually radially reducing the cross-sectional diameter of said end of said plug from its maximum diametrical periphery towards the opening of said bore in said end of said plug;

said tapered end on said plug forming an aperture having a tapered defining wall in the one part with the small end of the tapered wall closely fitting on the shaft of the other part after molding.

5. In a mold as set forth in claim 1, said end of said plug lying axially slightly spaced from said inner cavity portions to permit injection molded material to flow between said inner and outer cavity portions to form a thin frangible web interconnecting the part made in said inner cavity portions and the part made in said outer cavity portions at the shaft on one part and the bearing aperture of the other part;

the web being easily severed after the molding operation to permit relative rotational movement between the parts.

6. In a mold as set forth in claim 1, a counter-bore in said plug leading axially through said plug and enlarging said bore in said end of said plug, a tubular slide-sleeve in said counter-bore of said plug, said plug end having a tip and said sleeve having a tip in alignment therewith;

a core member in said sleeve having an end face axially within said sleeve defining the bottom of said plug bore for forming a shaft, said sleeve having an internal side wall above said core face defining the side wall of said bore in said plug for forming a shaft;

said aligned tips of said plug end and said sleeve lying spaced within said outer cavity portions to allow material flow between said inner and outer cavity portions to form a web of material between the part formed in the outer cavity portions at the shaft formed in said plug bore on the part formed in the inner cavity portions;

said sleeve-slide being advanceable relative to said cavity portions to sever a web so formed to free the shaft for rotational movement.

7. In a mold as set forth in claim 6, said tip of said plug end and said tip on said sleeve both being tapered and lying in angular alignment to form a tapered bearing aperture in said part formed in said outer cavity portions.

* * * * *